: 3,100,760
POLYMERIC ADHESIVES AND METHOD
OF PREPARATION
Harold P. Brown, Maxie R. Walters, and John F. Anderson, Akron, Ohio, assignors to The B. F. Goodrich Company, New York, N.Y., a corporation of New York
No Drawing. Filed Oct. 10, 1960, Ser. No. 61,393
15 Claims. (Cl. 260—86.1)

This invention relates to novel polyacrylate adhesives and more particularly pertains to novel water-resistant acrylate ester copolymers, to laminated structures containing said novel copolymers as adhesives and to a method for preparing said novel copolymers and laminated structures.

Acrylate ester copolymers are known to have good adhesive properties particularly when they contain polar groups such as carboxyl, anhydride, amide, hydroxyl, cyano, sulfhydryl, keto, aldehyde, halo groups and the like. The presence of polar groups of the aforementioned types and others in acrylate ester copolymers generally has the disadvantage of imparting water-sensitivity and polar solvent-sensitivity to said copolymers. It would be highly desirable therefore to devise an acrylate ester copolymer which has good adhesive properties without the usual attendant water-sensitivity.

It is an object of the present invention to provide a novel, water-insensitive acrylate ester copolymer adhesive. Another object is the provision of a novel adhesive having unusual and unexpected bonding strength to numerous types of substrates. Another object is the provision of novel laminated articles which are inert to the solvent action of water and other polar solvents. Still another object is the provision of a method for producing novel adhesives and laminated articles.

The accomplishment of the foregoing and other objects will become apparent from the description and illustrative examples to follow, it being understood that numerous changes and modifications can be made by those skilled in the art in the specific products and process set forth herein without departing from the spirit and scope of this invention.

We have discovered a novel water-insensitive adhesive comprising a copolymer of (1) at least one ester of a primary monohydric alcohol and acrylic acid and (2) at least one ester of acrylic acid and a monohydroxy compound having the hydroxyl group on a carbon atom which is free of hydrogen. More preferred are the copolymers of (1) from 20 to 80% by weight of a monomer having the structure

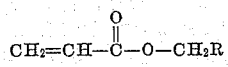

wherein R represents an alkyl group having from 3 to 9 carbon atoms and (2) from 80 to 20% by weight of at least one monomer selected from the class consisting of those having the structure

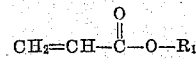

wherein $R_1$ represents an aromatic hydrocarbon group having from 6 to 10 carbons and those having the structure

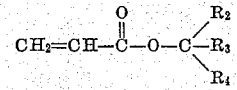

wherein $R_2$, $R_3$ and $R_4$ each represents an aliphatic hydrocarbon group having from 1 to 7 carbon atoms and the total number of carbon atoms in $R_2$, $R_3$ and $R_4$ does not exceed 10.

The monomers having the structure

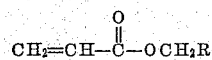

embodied herein include, but are not limited to, such specific compounds as n-butyl acrylate, isobutyl acrylate, n-amyl acrylate, isoamyl acrylate, the acrylate esters of the monohydric primary hexyl alcohols, the acrylate esters of the monohydric primary heptyl alcohols, the acrylate esters of the monohydric primary octyl alcohols, the acrylate esters of the monohydric primary nonyl alcohols and the acrylate esters of the monohydric primary decyl alcohols.

The monomers having the structure

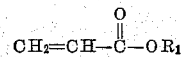

embodied herein include, but are not limited to, such specific compounds as phenyl acrylate, o-cresyl acrylate, m-cresyl acrylate, p-cresyl acrylate, alpha-naphthyl acrylate and beta-naphthyl acrylate and the like.

The monomers having the structure

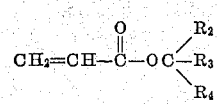

include, but are not limited to, such specific compounds as t-butyl acrylate, t-amyl acrylate, the acrylate esters of the monohydric t-hexyl alcohols, the acrylate esters of the monohydric t-heptyl alcohols, the acrylate esters of the monohydric t-nonyl alcohols and the acrylate esters of the monohydric t-decyl alcohols.

A most preferred class of copolymers for the purpose of the present invention are the copolymers of from about 40 to 55% by weight of n-butyl acrylate and from about 45 to 60% by weight of t-butyl acrylate.

Another most preferred class of copolymers for the purpose of this invention are the copolymers of from about 30 to 50% by weight of 2-ethylhexyl acrylate and from about 50 to 70% by weight of t-butyl acrylate.

Still another class of most preferred copolymers are those of from about 20 to 50% by weight of n-butyl acrylate and from about 50 to 80% by weight of t-amyl acrylate.

Yet another most preferred class of copolymers are those of from about 20 to 30% by weight of naphthyl acrylate and from about 70 to 80% by weight of n-butyl acrylate.

Another most preferred class of copolymers embodied in the present invention are the copolymers of from about 40 to about 50% by weight of phenyl acrylate and from about 50 to 60% by weight of n-butyl acrylate.

The polymeric adhesives embodied herein are useful for bonding together both like and unlike surfaces of a wide variety of types and composition. Surfaces such as those of wood, leather, animal skin, human skin, cotton, wool, paper, natural and synthetic resins, natural and synthetic rubbers, metals, alloys, ceramic materials and the like are among those to which the polymeric adhesives of this invention will bond.

The preferred laminated articles embodied herein are those comprising laminated structures of at least one film-forming thermoplastic polymer including the polyester resins such as the linear highly polymerized ester of terephthalic acid and a glycol of the series $HO(CH_2)_nOH$ wherein $n$ is a whole number within the range of 2 to 10; linear polyvinyl halides such as polyvinyl chloride, polyvinyl bromide, polyvinyl fluoride, polyvinylidene chloride, polyvinylidene bromide, polyvinylidene fluoride, poly-dichloro-difluoroethylene, polychlorotrifluoroethylene, and the like; polymonoolefins such as polyethylene, polypropylene, polybutene-1, polystyrene and the like; post-halogenated, sulfohalogenated and hydrohalogenated polymers of the aforesaid types such as post-chlorinated polyvinyl chloride, chlorinated polyethylene, sulfochlorinated polyethylene and the like; halogenated rubbers and both plasticized and unplasticized compositions containing as essential ingredients at least one of the aforementioned polymer types.

The laminated articles of this invention have a wide variety of uses including packaging, protective coating and decorative purposes and the like. In some of these applications, such as in packaging of comestibles and pressure-sensitive tapes, the laminated structures must be flexible and in others, such as protective wall coverings, flexibility is not essential. In all of these applications good adhesion, cohesion and water insensitivity is of prime importance.

The acrylate ester copolymers embodied herein may be prepared by mass (or bulk), emulsion or solvent polymerization techniques. For the purposes of this invention the solvent polymerization technique is preferred because of the superior adhesive properties of the resulting polymer. It is also convenient to apply the polyacrylate adhesives to the desired substrate in the form of a high solids cement of the type which results directly as the product of solvent polymerization.

Representative diluents which are useful in the preferred solvent polymerization procedure include aromatic hydrocarbons such as toluene, xylene, mesitylene, benzene and the like; aliphatic hydrocarbons such as butane, pentane, hexane, heptane and the like; aliphatic ketones such as acetone, methyl ethyl ketone, methyl isobutyl ketone and the like; halogenated hydrocarbons such as chloroform, bromotrichloromethane, and the like; and aliphatic esters such as ethyl acetate, propyl acetate, ethyl propionate, and the like and others and mixtures of same. The preferred diluents for the polymerization process of this invention are those which are of relatively high volatility and also have some modifying action on the polymer as it forms. The preferred diluents include toluene, xylene, bromotrichloromethane, methyl ethyl ketone and methyl isobutyl ketone. It is also preferred that the acrylate ester copolymers embodied herein have molecular weights corresponding to dilute solution viscosities of from about 0.25 to about 1.75 and preferably of from about 0.5 to 0.75. The dilute solution viscosities for polymers embodied herein are determined on solutions of polymers in methyl ethyl ketone. Dilute solution viscosities are expressed as $$\frac{2.3 \times \log \text{relative viscosity}}{\text{concentration}}$$

wherein concentration is expressed as grams of polymer per 100 ml. of methyl ethyl ketone and relative viscosity is determined in an Ostwald viscosimeter.

The polymers embodied herein are prepared by free-radical initiation. Free radical initiators such as peroxides, hydroperoxides, acyl peroxides, azo compounds and redox initiators all well known in the art are all suitable for this purpose. Similarly, free radicals may be generated by various forms of radiant energy such as ultra violet light, gamma rays, X-rays and the like as a means for initiating the polymerization reaction embodied herein. Generally from about 0.1 to about 5 parts by weight of initiator based on 100 parts by weight of monomers present in the polymerization mixture is satisfactory. Temperatures employed during the polymerization process can vary from 0° C. to 100° C. or higher. Most uniform and satisfactory polymers result when the polymerization is carried out at a temperature of from about 40° C. to about 70° C.

The laminated articles embodied herein may be prepared by coating one surface of a sheet or film with a cement of the polymeric adhesive, evaporating the solvent from the adhesive and pressing the surface of a second lamina to the adhesive coated surface of the first coated sheet or film. The polymeric adhesives can be readily sandwiched between the laminae on a roll mill or calender the rolls of which are maintained at a temperature sufficiently high to cause the adhesive to fuse and adhere to the contacted surfaces of the laminae.

In the following illustrative examples the amounts of ingredients are given in parts by weight unless otherwise specified.

Example I

A series of n-butyl acrylate-t-butyl acrylate copolymers were prepared at 50° C. in an essentially oxygen-free nitrogen atmosphere in a batch-charge from the following recipe:

| | |
|---|---|
| n-Butyl acrylate | Variable |
| t-Butyl acrylate | Variable |
| Methyl ethyl ketone | 100 |
| Azobisisobutyronitrile | 2.0 |

The polymerization reactions were completed in about 16 hours. In each case the resulting polymer solution was clear and viscous but pourable. In general the viscosity of the solutions increased with increased levels of t-butyl acrylate in the polymerization charge. The dilute solution viscosities of the polymers were determined using 0.5 g. of polymer per 100 g. of methyl ethyl ketone in an Ostwald type viscosimeter. The dilute solution viscosities varied from 0.7 to 0.75.

Laminated structures were prepared by putting a uniformly thick coating of one of the polymer cements on a strip of clean 0.001 inch thick aluminum foil by means of a calibrated pull-down bar, allowing the solvent to evaporate, placing the coated aluminum strip on a heated steel plate with the coated side up and rolling with pressure a 0.001 inch thick film of high molecular weight polyethylene terephthalate ester onto the coated surface of the heated aluminum foil in such a manner as to cause the polyester film to adhere uniformly to the coated surface of the aluminum foil. The resulting laminated structures were about 0.0035 inch thick when cooled to ambient temperature. The strength of the adhesive bond in the above-described laminated structures was measured as the force in ounces required to pull one of the laminae away from the other at the adhesive interface at a standard rate of rupture of the bond. The bond strength tests were run on strips of laminate which were exactly one inch wide. In this and the following examples the bond strengths of the aluminum foil-to-polyethylene terephthalate film laminates were determined at a standard rupture rate of 12 inches per minute. Bond strengths in excess of about 50 oz./in. are considered to be superior in this test. The polymeric adhesive compositions and bond strengths obtained in the foregoing test are listed below.

| Polymer composition | | Bond strength, oz./in. |
|---|---|---|
| n-Butyl acrylate | t-Butyl acrylate | |
| 0 | 100 | 18 |
| 20 | 80 | 32 |
| 30 | 70 | 40 |
| 40 | 60 | 72 |
| 48 | 52 | 112 |
| 50 | 50 | 128 |
| 51 | 49 | 112 |
| 54 | 46 | 112 |
| 57 | 43 | 72 |
| 60 | 40 | 72 |
| 100 | 0 | 6 |

It is evident that neither of the above homopolymers is particularly good as an adhesive. Surprisingly, however, the copolymers prepared from about 40 to 60% of t-butyl acrylate are remarkably strong bonding adhesives.

In a similar manner to that described above copolymers were prepared using 1 part of benzoyl peroxide and a diluent consisting of 80 parts methyl ethyl ketone and 20 parts of hexane. The 50–50 copolymer of t-butyl acrylate and n-butyl acrylate had a bond strength of 176 oz./in. in the aluminum foil-to-polyethylene terephthalate film test described above. Another 50–50 copolymer of n-butyl acrylate and t-butyl acrylate prepared in 100 parts of toluene and tested in the foregoing manner had a bond strength of 112 oz./in. Likewise the following results were obtained for copolymers prepared with 2 parts of benzoyl peroxide and a 50–50 mixture of methyl ethyl ketone-hexane.

| Polymer composition | | Bond strength, oz./in. |
|---|---|---|
| n-Butyl acrylate | t-Butyl acrylate | |
| 85 | 15 | 24 |
| 70 | 30 | 52 |
| 55 | 45 | 136 |
| 50 | 50 | 144 |
| 45 | 55 | 144 |

The 50–50 copolymers were excellent adhesives for tin-to-polyvinyl chloride, copper-to-rubber hydrochloride and aluminum-to-polyethylene.

EXAMPLE II

A series of 2-ethylhexyl acrylate-t-butyl acrylate copolymers were prepared using the procedure described in the first paragraph of Example I. The copolymer solutions had dilute solution viscosities in methyl ethyl ketone of from 0.55 to 0.66. The copolymers were evaluated as adhesives in the aluminum foil-to-polyethylene terephthalate film test described in Example I.

| Polymer composition | | Bond strength, oz./in. |
|---|---|---|
| 2-ethylhexyl acrylate | t-butyl acrylate | |
| 100 | 0 | 0 |
| 90 | 10 | 2 |
| 80 | 20 | 6 |
| 70 | 30 | 12 |
| 60 | 40 | 40 |
| 50 | 50 | 96 |
| 40 | 60 | 128 |
| 30 | 70 | 96 |
| 20 | 80 | 36 |
| 0 | 100 | 18 |

It is evident from the foregoing that copolymers prepared from about 50 to 70% t-butyl acrylate are superior adhesives. These polymers were excellent adhesives for tin-to-plasticized polyvinyl chloride, copper-to-polyethylene and aluminum-to-polyethylene.

Similarly n-butyl acrylate-sec. butyl acrylate and n-butyl acrylate-isobutyl acrylate copolymers were prepared and tested. The bond strengths of these copolymers, which are not within the scope of the present invention, are given below.

| Polymer composition | | Bond strength, oz./in. | Dilute solution viscosity |
|---|---|---|---|
| n-Butyl acrylate | Sec. butyl acrylate | | |
| 80 | 20 | 12 | 0.63 |
| 60 | 40 | 16 | 0.62 |
| 50 | 50 | 22 | 0.61 |
| 40 | 60 | 28 | 0.59 |
| 20 | 80 | 38 | 0.59 |

| Polymer composition | | Bond strength, oz./in. | Dilute solution viscosity |
|---|---|---|---|
| n-Butyl acrylate | Isobutyl acrylate | | |
| 80 | 20 | 10 | 0.63 |
| 60 | 40 | 16 | 0.67 |
| 50 | 50 | 20 | 0.68 |
| 40 | 60 | 26 | 0.70 |
| 20 | 80 | 40 | 0.64 |

*Example III*

A series of n-butyl acrylate-t-amyl acrylate copolymers were prepared using the procedure described in the first paragraph of Example I. The copolymers were tested as laminating adhesives for aluminum foil-to-polyethylene terephthalate film by the procedure outlined in Example I. The copolymer compositions and test results are given below.

| Polymer composition | | Bond strength, oz./in. | Dilute solution viscosity |
|---|---|---|---|
| n-Butyl acrylate | t-Amyl acrylate | | |
| 100 | 0 | 8 | 0.64 |
| 80 | 20 | 14 | 0.57 |
| 60 | 40 | 42 | 0.58 |
| 50 | 50 | 76 | 0.59 |
| 40 | 60 | 144 | 0.66 |
| 20 | 80 | 128 | 0.53 |
| 0 | 100 | 48 | 0.53 |

It is evident that neither of the above homopolymers is particularly good as an adhesive and is most striking and unexpected that copolymers prepared from about 50 to 80% of t-amyl acrylate are superior adhesives.

*Example IV*

A series of n-butyl acrylate-phenyl acrylate copolymers were prepared by the procedure given in the first paragraph of Example I. The copolymers were tested as adhesives in aluminum foil-to-polyethylene terephthalate film.

| Polymer composition | | Bond strength, oz./in. | Dilute solution viscosity |
|---|---|---|---|
| n-Butyl acrylate | Phenyl acrylate | | |
| 100 | 0 | 6 | 0.62 |
| 75 | 25 | 18 | 0.59 |
| 60 | 40 | 112 | 0.65 |
| 55 | 45 | 128 | 0.65 |
| 50 | 50 | 112 | 0.65 |
| 50 | 50 | 112 | 0.54 |
| 45 | 55 | 48 | 0.63 |

The above-described copolymers having composition in the range from about 40 to 55% phenyl acrylate were excellent adhesives for copper-to-polyethylene, tin-to-rubber hydrochloride and aluminum-to-plasticized polyvinyl chloride.

*Example V*

A series of n-butyl acrylate-alpha-naphthyl acrylate copolymers were prepared and tested as adhesives in aluminum foil-to-polyethylene terephthalate ester film laminates as described in Example I.

| Polymer composition | | Bond strength, oz./in. | Dilute solution viscosity |
|---|---|---|---|
| n-Butyl acrylate | Alpha-naphthyl acrylate | | |
| 100 | 0 | 8 | 0.62 |
| 90 | 10 | 20 | 0.58 |
| 80 | 20 | 88 | 0.57 |
| 70 | 30 | 64 | 0.52 |
| 60 | 40 | 40 | 0.47 |
| 50 | 50 | 48 | 0.43 |
| 40 | 60 | 32 | 0.38 |

It is evident that the above copolymers prepared from about 20 to 30% of alpha-naphthyl acrylate are superior adhesives. This superiority was evident in other laminated structures as well.

*Example VI*

A series of n-butyl acrylate-beta-naphthyl acrylate copolymers were prepared and evaluated as adhesives in aluminum foil-to-polyethylene terephthalate ester film laminates by the procedures given in Example I.

| Polymer composition | | Bond strength, oz./in. | Dilute solution viscosity |
|---|---|---|---|
| n-Butyl acrylate | Beta-naphthyl acrylate | | |
| 90 | 10 | 18 | 0.58 |
| 80 | 20 | 88 | 0.67 |
| 70 | 30 | 96 | 0.62 |
| 60 | 40 | 32 | 0.54 |
| 50 | 50 | 28 | 0.55 |

Similar to the results in Example V, the above copolymers prepared with from about 20 to 30% beta-naphthyl acrylate are superior adhesives.

In accordance with the teaching of British Patent No. 779,687 a 60:40 copolymer of ethyl methacrylate and n-butyl methacrylate was prepared. A 10% solution of the copolymer in dioxane solution containing 1% dibutyl phthalate as plasticizer was used to coat aluminum foil and an aluminum foil-to-polyethylene terephthalate ester film laminate was prepared and tested as described herein in Example I. A bond strength of zero oz./in. was observed. Similarly this prior art copolymer exhibited no bond strength when tried as adhesive for steel-to-steel, cellophane-to-steel and glass-to-glass laminates.

We claim:

1. The adhesive composition which is a copolymer formed by polymerizing a monomeric mixture composed of two esters of acrylic acid, said monomeric mixture selected from the group consisting of:
   (a) 40 to 60 weight percent of n-butyl acrylate and 40 to 60 weight percent of t-butyl acrylate,
   (b) 20 to 50 weight percent of n-butyl acrylate and 50 to 80 weight percent of t-amyl acrylate,
   (c) 70 to 80 weight percent of n-butyl acrylate and 20 to 30 weight percent of alpha-naphthyl acrylate,
   (d) 70 to 80 weight percent of n-butyl acrylate and 20 to 30 weight percent of beta-naphthyl acrylate,
   (e) 50 to 60 weight percent of n-butyl acrylate and 40 to 50 weight percent of phenyl acrylate, and
   (f) 30 to 50 weight percent of 2-ethylhexyl acrylate and 50 to 70 weight percent of t-butyl acrylate.

2. The adhesive composition which is a copolymer consisting of from 40 to 60% by weight of n-butyl acrylate and from 40 to 60% by weight of t-butyl acrylate.

3. The adhesive composition which is a copolymer consisting of from 30 to 50% by weight of 2-ethylhexyl acrylate and from 50 to 70% by weight of t-butyl acrylate.

4. The adhesive composition which is a copolymer consisting of from 20 to 50% by weight of n-butyl acrylate and from 50 to 80% of t-amyl acrylate.

5. The adhesive composition which is a copolymer consisting of from 20 to 30% by weight of alpha-naphthyl acrylate and from 70 to 80% by weight of n-butyl acrylate.

6. The adhesive composition which is a copolymer consisting of from 20 to 30% by weight of beta-naphthyl acrylate and from 70 to 80% by weight of n-butyl acrylate.

7. The adhesive composition which is a copolymer consisting of from 40 to 50% by weight of phenyl acrylate and from 50 to 60% by weight of n-butyl acrylate.

8. The method for producing an adhesive composition which comprises polymerizing a monomeric mixture composed of two esters of acrylic acid at a temperature of from about 40° C. to about 70° C., in an inert organic solvent in admixture with from about 0.1 to about 5 parts by weight of a free-radical polymerization catalyst per 100 parts by weight of the monomeric mixture of esters, said mixture being selected from the group consisting of:
   (a) 40 to 60 weight percent of n-butyl acrylate and 40 to 60 weight percent of t-butyl acrylate,
   (b) 20 to 50 weight percent of n-butyl acrylate and 50 to 80 weight percent of t-amyl acrylate,
   (c) 70 to 80 weight percent of n-butyl acrylate and 20 to 30 weight percent of alpha-naphthyl acrylate,
   (d) 70 to 80 weight percent of n-butyl acrylate and 20 to 30 weight percent of beta-naphthyl acrylate,
   (e) 50 to 60 weight percent of n-butyl acrylate and 40 to 50 weight percent of phenyl acrylate, and
   (f) 30 to 50 weight percent of 2-ethylhexyl acrylate and 50 to 70 weight percent of t-butyl acrylate.

9. A laminated structure comprising a film of a synthetic thermoplastic polymer composition adhered to the surface of a substrate material selected from the class consisting of wood, leather, cotton, wool, paper, natural resins, synthetic resins, natural rubber, synthetic rubbers, metal and ceramic, with a laminating adhesive, which adhesive is a linear copolymer formed by polymerizing a monomeric mixture composed of two esters of acrylic acid, said monomeric mixture selected from the group consisting of:
   (a) 40 to 60 weight percent of n-butyl acrylate and 40 to 60 weight percent of t-butyl acrylate,
   (b) 20 to 50 weight percent of n-butyl acrylate and 50 to 80 weight percent of t-amyl acrylate,
   (c) 70 to 80 weight percent of n-butyl acrylate and 20 to 30 weight percent of alpha-naphthyl acrylate,
   (d) 70 to 80 weight percent of n-butyl acrylate and 20 to 30 weight percent of beta-naphthyl acrylate,
   (e) 50 to 60 weight percent of n-butyl acrylate and 40 to 50 weight percent of phenyl acrylate, and
   (f) 30 to 50 weight percent of 2-ethylhexyl acrylate and 50 to 70 weight percent of t-butyl acrylate.

10. The laminated structure comprising a film-forming thermoplastic polymer adhered to at least one other surface with a laminating adhesive which is a linear copolymer consisting of from 40 to 60% by weight of n-butyl acrylate and from 40 to 60% by weight of t-butyl acrylate.

11. The laminated structure comprising a film-forming thermoplastic polymer adhered to at least one other surface with a laminating adhesive which is a copolymer consisting of from 30 to 50% by weight of 2-ethylhexyl acrylate and from 50 to 70% by weight of t-butyl acrylate.

12. The laminated structure comprising a film-forming thermoplastic polymer adhered to at least one other surface with a laminating adhesive which is a copolymer consisting of from 20 to 50% by weight of n-butyl acrylate and from 50 to 80% by weight of t-amyl acrylate.

13. The laminated structure comprising a film-forming thermoplastic polymer adhered to at least one other surface with a laminating adhesive which is a copolymer consisting of from 20 to 30% by weight of a naphthyl acrylate and from 70 to 80% by weight of n-butyl acrylate.

14. The laminated structure comprising a film-forming thermoplastic polymer adhered to at least one other surface with a laminating adhesive which is a copolymer consisting of from 40 to 50% by weight of phenyl acrylate and from 50 to 60% by weight of n-butyl acrylate.

15. The method for preparing a laminated structure comprising coating a film of a synthetic thermoplastic polymer composition with a solution of a laminating adhesive in an organic solvent, which adhesive is a linear copolymer formed by polymerizing a monomeric mixture composed of two esters of acrylic acid, said mixture selected from the group consisting of:

(a) 40 to 60 weight percent of n-butyl acrylate and 40 to 60 weight percent of t-butyl acrylate,
(b) 20 to 50 weight percent of n-butyl acrylate and 50 to 80 weight percent of t-amyl acrylate.
(c) 70 to 80 weight percent of n-butyl acrylate and 20 to 30 weight percent of alpha-naphthyl acrylate,
(d) 70 to 80 weight percent of n-butyl acrylate and 20 to 30 weight percent of beta-naphthyl acrylate,
(e) 50 to 60 weight percent of n-butyl acrylate and 40 to 50 weight percent of phenyl acrylate, and
(f) 30 to 50 weight percent of 2-ethylhexyl acrylate and 50 to 70 weight percent of t-butyl acrylate, allowing the solvent to evaporate, and then adhering the adhesive coated film to the surface of a substrate material selected from the class consisting of wood, leather, cotton, wool, paper, natural resins, synthetic resins, natural rubber, synthetic rubbers, metal and ceramic.

References Cited in the file of this patent

UNITED STATES PATENTS

| | | |
|---|---|---|
| 2,129,664 | Barrett et al. | Sept. 13, 1938 |
| 2,729,625 | Hurwitz | Jan. 3, 1956 |
| 2,744,886 | Protzman | May 8, 1956 |
| 2,861,060 | Goode | Nov. 18, 1958 |